(12) United States Patent
Sugimoto (10) Patent No.: US 11,536,214 B2
(45) Date of Patent: Dec. 27, 2022

(54) MISFIRE DETECTING DEVICE AND METHOD FOR INTERNAL COMBUSTION ENGINE

(71) Applicant: TOYOTA JIDOSHA KABUSHIKI KAISHA, Toyota (JP)

(72) Inventor: Hitoki Sugimoto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/448,392

(22) Filed: Sep. 22, 2021

(65) Prior Publication Data

US 2022/0112853 A1    Apr. 14, 2022

(30) Foreign Application Priority Data

Oct. 9, 2020    (JP) .............................. JP2020-171006

(51) Int. Cl.
*F02D 41/14*    (2006.01)
*F02D 41/00*    (2006.01)
(Continued)

(52) U.S. Cl.
CPC ......... *F02D 41/1498* (2013.01); *F02D 37/02* (2013.01); *F02D 41/009* (2013.01); *F02D 41/0097* (2013.01); *F02D 41/024* (2013.01); *F02P 5/152* (2013.01); *G01M 15/11* (2013.01); *F02D 2200/0802* (2013.01);
(Continued)

(58) Field of Classification Search
CPC .. F02D 13/06; F02D 17/02; F02D 2200/1002; F02D 2200/1004; F02D 2200/101; F02D 2200/1012; F02D 2200/1015; F02D 41/008; F02D 41/0087; F02D 41/009; F02D 41/0097; F02D 41/1498; F02D 41/22; F02D 2041/0012; G01M 15/11
See application file for complete search history.

(56) References Cited

U.S. PATENT DOCUMENTS

| | | | | | |
|---|---|---|---|---|---|
| 5,044,194 | A | * | 9/1991 | James | ................. G01M 15/042 73/114.15 |
| 5,044,195 | A | * | 9/1991 | James | .................... G01M 15/11 73/114.05 |

(Continued)

FOREIGN PATENT DOCUMENTS

| | | |
|---|---|---|
| EP | 1 852 594 A1 | 11/2007 |
| JP | 2006-266253 A | 10/2006 |
| JP | 2014-070551 A | 4/2014 |

*Primary Examiner* — John M Zaleskas
(74) *Attorney, Agent, or Firm* — Oblon, McClelland, Maier & Neustadt, L.L.P.

(57) ABSTRACT

A CPU determines that there is a misfire when a relative magnitude of a rotation fluctuation amount $\Delta T30[0]$ related to a cylinder subject to the determination in relation to a rotation fluctuation amounts $\Delta T30[4]$ of the previous combustion cycle is greater than or equal to the determination value $\Delta th$. However, during the execution of a catalyst warm-up process, the CPU uses, in the comparison, the relative magnitude of the rotation fluctuation amount $\Delta T30[0]$ in relation to the average $\Delta T30ave[0]$ of the smallest five of the rotation fluctuation amounts $\Delta T30[4]$ to $\Delta T30[40]$ from the past ten combustion cycles.

13 Claims, 8 Drawing Sheets

(51) Int. Cl.
  *F02P 5/152*   (2006.01)
  *G01M 15/11*  (2006.01)
  *F02D 37/02*   (2006.01)
  *F02D 41/02*   (2006.01)

(52) U.S. Cl.
  CPC .............. *F02D 2200/101* (2013.01); *F02D 2200/1002* (2013.01); *F02D 2200/1012* (2013.01); *F02D 2200/1015* (2013.01)

(56) References Cited

U.S. PATENT DOCUMENTS

| | | | | |
|---|---|---|---|---|
| 5,095,742 A * | 3/1992 | James | ................ | F02D 41/1497 73/114.24 |
| 5,109,695 A * | 5/1992 | James | ................ | G01M 15/11 73/114.05 |
| 5,222,392 A * | 6/1993 | Baba | ................ | G01M 15/11 73/114.03 |
| 5,245,866 A * | 9/1993 | Hashiguchi | ................ | G01M 15/11 73/114.04 |
| 5,275,037 A * | 1/1994 | Nakayama | ................ | G01M 15/11 73/114.03 |
| 5,287,736 A * | 2/1994 | Nakayama | ................ | G01M 15/11 73/114.04 |
| 5,373,732 A * | 12/1994 | Kuroda | ................ | G01M 15/11 73/114.04 |
| 5,381,688 A * | 1/1995 | Ikeda | ................ | G01B 5/28 73/105 |
| 5,390,537 A * | 2/1995 | Kuroda | ................ | G01M 15/11 73/114.04 |
| 5,442,955 A * | 8/1995 | Baba | ................ | G01M 15/11 340/439 |
| 5,499,537 A * | 3/1996 | Nakayama | ................ | G01M 15/11 701/111 |
| 5,506,778 A * | 4/1996 | Matsumoto | ................ | F02D 41/1498 701/111 |
| 5,509,268 A * | 4/1996 | Kuroda | ................ | F02D 41/22 60/277 |
| 5,539,644 A * | 7/1996 | Ichikawa | ................ | G01M 15/11 701/99 |
| 5,544,521 A * | 8/1996 | McCombie | ................ | G01M 15/11 73/114.12 |
| 5,574,217 A * | 11/1996 | McCombie | ................ | G01M 15/11 701/111 |
| 5,602,331 A * | 2/1997 | Prevost | ................ | G01M 15/11 701/50 |
| 5,687,692 A * | 11/1997 | Togai | ................ | F02D 41/1498 123/436 |
| 5,728,941 A * | 3/1998 | Yamamoto | ................ | G01M 15/11 123/436 |
| 5,747,681 A * | 5/1998 | Kuroda | ................ | G01M 15/11 73/114.04 |
| 5,804,711 A * | 9/1998 | Remboski | ................ | G01M 15/11 73/114.05 |
| 5,832,404 A * | 11/1998 | Amano | ................ | G01M 15/11 123/436 |
| 5,954,784 A * | 9/1999 | Inada | ................ | G01M 15/11 123/436 |
| 6,023,651 A * | 2/2000 | Nakayama | ................ | F02D 41/1498 123/436 |
| 6,070,567 A * | 6/2000 | Kakizaki | ................ | F02D 41/1498 123/436 |
| 6,439,039 B1 * | 8/2002 | Davison | ................ | G01M 15/046 73/114.62 |
| 2004/0144165 A1 * | 7/2004 | Yamada | ................ | G01M 15/11 73/114.06 |
| 2007/0261484 A1 * | 11/2007 | Nishigaki | ................ | G01M 15/11 73/114.04 |
| 2008/0148835 A1 * | 6/2008 | Akimoto | ................ | B60W 30/20 73/116.01 |
| 2008/0189023 A1 * | 8/2008 | Lewis | ................ | G01M 15/11 701/102 |
| 2008/0196485 A1 * | 8/2008 | Akimoto | ................ | G01M 15/046 73/114.02 |
| 2009/0118990 A1 * | 5/2009 | Suzuki | ................ | F02D 29/02 701/111 |
| 2009/0120174 A1 * | 5/2009 | Nodera | ................ | G01M 15/11 73/114.04 |
| 2009/0145210 A1 * | 6/2009 | Suzuki | ................ | G01M 15/11 73/114.04 |
| 2009/0151469 A1 * | 6/2009 | Suzuki | ................ | B60W 10/06 903/902 |
| 2009/0158829 A1 * | 6/2009 | Suzuki | ................ | F02D 41/0097 73/114.25 |
| 2009/0308145 A1 * | 12/2009 | Suzuki | ................ | F02D 41/2451 180/65.28 |
| 2010/0030455 A1 * | 2/2010 | Akimoto | ................ | B60L 50/61 701/111 |
| 2010/0114460 A1 * | 5/2010 | Akimoto | ................ | F02D 29/06 73/114.26 |
| 2010/0218598 A1 * | 9/2010 | Suzuki | ................ | G01M 15/11 73/114.04 |
| 2013/0096805 A1 * | 4/2013 | Hoshi | ................ | F02D 41/1498 73/114.25 |
| 2016/0152231 A1 * | 6/2016 | Sugimoto | ................ | B60W 50/0205 903/905 |
| 2016/0333764 A1 * | 11/2016 | Sugimoto | ................ | F02D 41/2406 |
| 2016/0334305 A1 * | 11/2016 | Hyodo | ................ | G01M 15/11 |
| 2017/0299468 A1 * | 10/2017 | Jino | ................ | F02P 17/12 |
| 2018/0246011 A1 * | 8/2018 | Katayama | ................ | G01M 15/11 |
| 2020/0263617 A1 | 8/2020 | Hashimoto et al. | | |
| 2020/0309053 A1 | 10/2020 | Anzawa | | |
| 2020/0309054 A1 | 10/2020 | Anzawa | | |
| 2022/0099037 A1 * | 3/2022 | Sugimoto | ................ | F02D 41/2429 |
| 2022/0099528 A1 * | 3/2022 | Sugimoto | ................ | G01M 15/11 |
| 2022/0120231 A1 * | 4/2022 | Sugimoto | ................ | G01M 15/11 |

* cited by examiner

MISFIRE DETECTING DEVICE AND METHOD FOR INTERNAL COMBUSTION ENGINE

BACKGROUND

Field

The present disclosure relates to a misfire detecting device and method for an internal combustion engine.

2. Description of Related Art

Japanese Laid-Open Patent Publication No. 2006-266253 discloses a device that determines whether there is a misfire based on an output signal of a crank angle sensor. In the document, a rotation speed of a crankshaft, which is calculated at each 60° C.A based on teeth of a crank rotor, and a difference between a value of the rotation speed prior to a compression top dead center and a value of the rotation speed after the compression top dead center is defined as a rotational fluctuation Nxd. Also, the difference between the calculated rotational fluctuation Nxd and a past rotational fluctuation Nxd that precedes the calculated rotational fluctuation Nxd by 360° C.A is defined as a rotational fluctuation difference. The device is configured to determine whether there is a misfire based on a comparison between the rotational fluctuation difference and a determination value.

In the above-described document, the rotational fluctuation Nxd is not simply compared with a determination value. However, the rotational fluctuation difference is compared with a determination value. Accordingly, the rotational fluctuation Nxd that precedes the current rotational fluctuation Nxd by 360° C.A is used as a reference value for the current rotational fluctuation Nxd. Also, the rotational fluctuation Nxd that precedes the current rotational fluctuation Nxd by 360° C.A and the current rotational fluctuation Nxd are both calculated using the same tooth of the crank rotor. In this case, the rotational fluctuation Nxd that precedes the current rotational fluctuation Nxd by 360° C.A and the current rotational fluctuation Nxd are affected by the tolerances and the like of the crank rotor to a similar degree.

However, in a situation in which the rotation behavior of the crankshaft is unstable, noise due to the unstable rotation behavior may be superimposed on the rotational fluctuation Nxd that precedes the current rotational fluctuation Nxd by 360° C.A. This may reduce the accuracy of the determination as to whether there is a misfire based on the comparison between the rotational fluctuation difference and the determination value.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a misfire detecting device for an internal combustion engine is provided. The misfire detecting device is configured to execute: a calculating process that calculates a torque index value using an output signal of a crank angle sensor as an input; and a determination process that determines whether there is a misfire based on a magnitude of the torque index value related to a cylinder subject to determination as to whether there is a misfire in the internal combustion engine. The determination process determines whether there is the misfire based on a comparison between a determination value and a relative magnitude of the current torque index value of the cylinder subject to the determination in relation to an average of past torque index values. The past torque index values are values related to cylinders in each of which a compression top dead center occurs at a point separated from a compression top dead center of the cylinder subject to the determination by an integral multiple of an angle corresponding to one turn of a crankshaft. The torque index value is a variable that characterizes a torque of the crankshaft having a cycle of a length corresponding to an interval between occurrences of the compression top dead center.

The torque of the crankshaft has a cycle the length of which corresponds to the interval between occurrences of the compression top dead center due to the combustion stroke in each cylinder of the internal combustion engine. Thus, the magnitude of the torque index value, which is a variable characterizing the torque of the crankshaft having a cycle of a length corresponding to the interval between occurrences of the compression top dead center, includes information related to whether there is a misfire. In the above-described configuration, instead of comparing the magnitude of the current torque index value of the cylinder subject to the determination with the determination value, the relative magnitude of the current torque index value of the cylinder subject to the determination in relation to the average of the past torque index values is compared with the determination value. The past torque index values are values related to cylinders in each of which the compression top dead center occurs at a point separated from the compression top dead center of the cylinder subject to the determination by an integral multiple of the angle corresponding to one turn of the crankshaft. The influence of tolerances and the like on each of the past torque index values is equivalent to the influence of the tolerances and the like on the torque index value of the current torque index value related to the cylinder subject to the determination. Further, the use of the average of the past torque index values as a reference minimizes the influence of an unstable rotation behavior of the crankshaft on the average of the past torque index values even if the unstable rotation behavior of the crankshaft is reflected on the past torque index values. Thus, even if the rotation behavior of the crankshaft is unstable, the accuracy of determination as to whether there is a misfire will not be reduced.

In the above-described misfire detecting device for the internal combustion engine, the average is preferably obtained by selecting a specific number of torque index values from a defined number of the torque index values that were calculated in the past and averaging the specific number of the torque index values, the specific number of the torque index values being farthest from a value at a time when the misfire occurs, and the specific number is preferably less than the defined number.

Even if there is no misfire, unstable combustion may cause the torque index value to approach the value at the time when a misfire occurs. When calculating the average of the past torque index values, the above-described configuration selectively uses torque index values farthest from the value at the time when a misfire occurs. The average of the past torque index values is thus suitable as a torque index value functioning as a reference at the time when a misfire is not occurring.

In the above-described misfire detecting device for the internal combustion engine, the misfire detecting device is preferably configured to: execute a retardation process that retards ignition timing when a temperature of a catalyst in an exhaust passage of the internal combustion engine is relatively low; and execute the determination process during the retardation process.

During the execution of the retardation process, the combustion of air-fuel mixture in each cylinder and the rotation behavior of the crankshaft tend to be unstable as compared to a case in which the retardation process is not being executed. It is thus particularly useful to set a torque index value that is compared to the current torque index value related to the cylinder subject to determination to the average of the torque index values farthest from the value at the time when a misfire occurs.

In the above-described misfire detecting device for the internal combustion engine, the torque index value is preferably a rotation fluctuation amount. The rotation fluctuation amount is preferably a variable representing a change of an instantaneous speed variable. The instantaneous speed variable is preferably a variable representing a speed of the crankshaft when the crankshaft rotates in a rotation angle range that is less than or equal to the interval between occurrences of the compression top dead center.

The above-described configuration uses a change in the instantaneous speed variable to quantify the rotation fluctuation amount, so as to properly quantify the rotation fluctuation amount caused by a misfire.

In the above-described misfire detecting device for the internal combustion engine, the misfire detecting device is preferably configured to further execute a low frequency component extracting process that extracts an amount of change of a rotation speed of the crankshaft over a period longer than a single combustion cycle. The determination process preferably includes a process that determines whether there is the misfire based on whether an absolute value of a difference between the relative magnitude and a magnitude of the determination value is greater than or equal to an absolute value of the amount of change extracted by the low frequency component extracting process.

The rotation speed of the crankshaft may change over a period longer than a single combustion cycle. Such a change in the rotation speed of the crankshaft affects the average of torque index values. The absolute value of the difference between the relative magnitude and the magnitude of the determination value includes influence of the amount of change extracted through the low frequency component extracting process. The amount of the influence is equivalent to the absolute value of the amount of change extracted through the low frequency component extracting process. The above-described configuration determines whether there is a misfire based on whether the absolute value of the difference between the magnitude of the determination value and the relative magnitude of the current torque index value in relation to the average of the past torque index values is greater than or equal to the absolute value of the amount of change extracted through the low frequency component extracting process. This reduces the influence of the low frequency components on the accuracy of the determination as to whether there is a misfire.

In the above-described misfire detecting device for the internal combustion engine, the low frequency component extracting process is preferably a process that extracts, as the amount of change, an average of respective differences between a predetermined number of the rotation fluctuation amounts that are most recent in relation to the rotation fluctuation amount related to the cylinder subject to the determination, and the predetermined number of the averages obtained prior to the rotation fluctuation amount of the cylinder subject to the determination.

The relative magnitude of the rotation fluctuation amount of the cylinder subject to the determination in relation to the average of the past torque index values is the relative magnitude of a single rotation fluctuation amount in relation to the average of the past rotation fluctuation amounts. Thus, according to the above-described configuration, the low frequency component extracting process obtains differences between the single rotation fluctuation amount and the past averages, and extracts the average of a predetermined number of the differences as the amount of change. This accurately quantifies the influence of the low frequency components on the relative magnitude of the single rotation fluctuation amount in relation to the average of the past rotation fluctuation amounts.

In the above-described misfire detecting device for the internal combustion engine, the crankshaft is preferably mechanically coupled to an electric motor. The misfire detecting device is preferably configured to: execute a fixed-value control process that uses the electric motor to control a rotation speed of the crankshaft to a fixed value; and execute the determination process during the fixed-value control process.

The rotation speed of the crankshaft may change over a period longer than a single combustion cycle. Such a change in the rotation speed of the crankshaft affects the average of torque index values. The above-described configuration executes the determination process based on the relative magnitude in relation to the average when the fixed-value control process is being executed. That is, the configuration can execute the determination process can be executed while suppressing a change in the rotation speed of the crankshaft over a period longer than one combustion cycle of the crankshaft. The average of the past torque index values is thus suitable as a rotation fluctuation amount that is reference in relation to the rotation fluctuation amount related to the cylinder subject to the determination.

In a second general aspect, a misfire detecting device for an internal combustion engine is provided. The misfire detecting device incudes circuitry. The circuitry is configured to execute: a calculating process that calculates a torque index value using an output signal of a crank angle sensor as an input; and a determination process that determines whether there is a misfire based on a magnitude of the torque index value related to a cylinder subject to determination as to whether there is a misfire in the internal combustion engine. The determination process determines whether there is the misfire based on a comparison between a determination value and a relative magnitude of the current torque index value of the cylinder subject to the determination in relation to an average of past torque index values. The past torque index values are values related to cylinders in each of which a compression top dead center occurs at a point separated from a compression top dead center of the cylinder subject to the determination by an integral multiple of an angle corresponding to one turn of a crankshaft. The torque index value is a variable that characterizes a torque of the crankshaft having a cycle of a length corresponding to an interval between occurrences of the compression top dead center.

In a third general aspect, a misfire detecting method for an internal combustion engine is provided. The method includes: calculating a torque index value using an output signal of a crank angle sensor as an input; and determining whether there is a misfire based on a magnitude of the torque index value related to a cylinder subject to determination as to whether there is a misfire in the internal combustion engine. The determination process determines whether there is the misfire based on a comparison between a determination value and a relative magnitude of the current torque index value of the cylinder subject to the determination in relation to an average of past torque index values. The past torque index values are values related to cylinders in each of which a compression top dead center occurs at a point separated from a compression top dead center of the cylinder subject to the determination by an integral multiple of an angle corresponding to one turn of a crankshaft. The torque index value is a variable that characterizes a torque of the crankshaft having a cycle of a length corresponding to an interval between occurrences of the compression top dead center.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

FIRST EMBODIMENT

A first embodiment will now be described with reference to the drawings.

Figure 1:
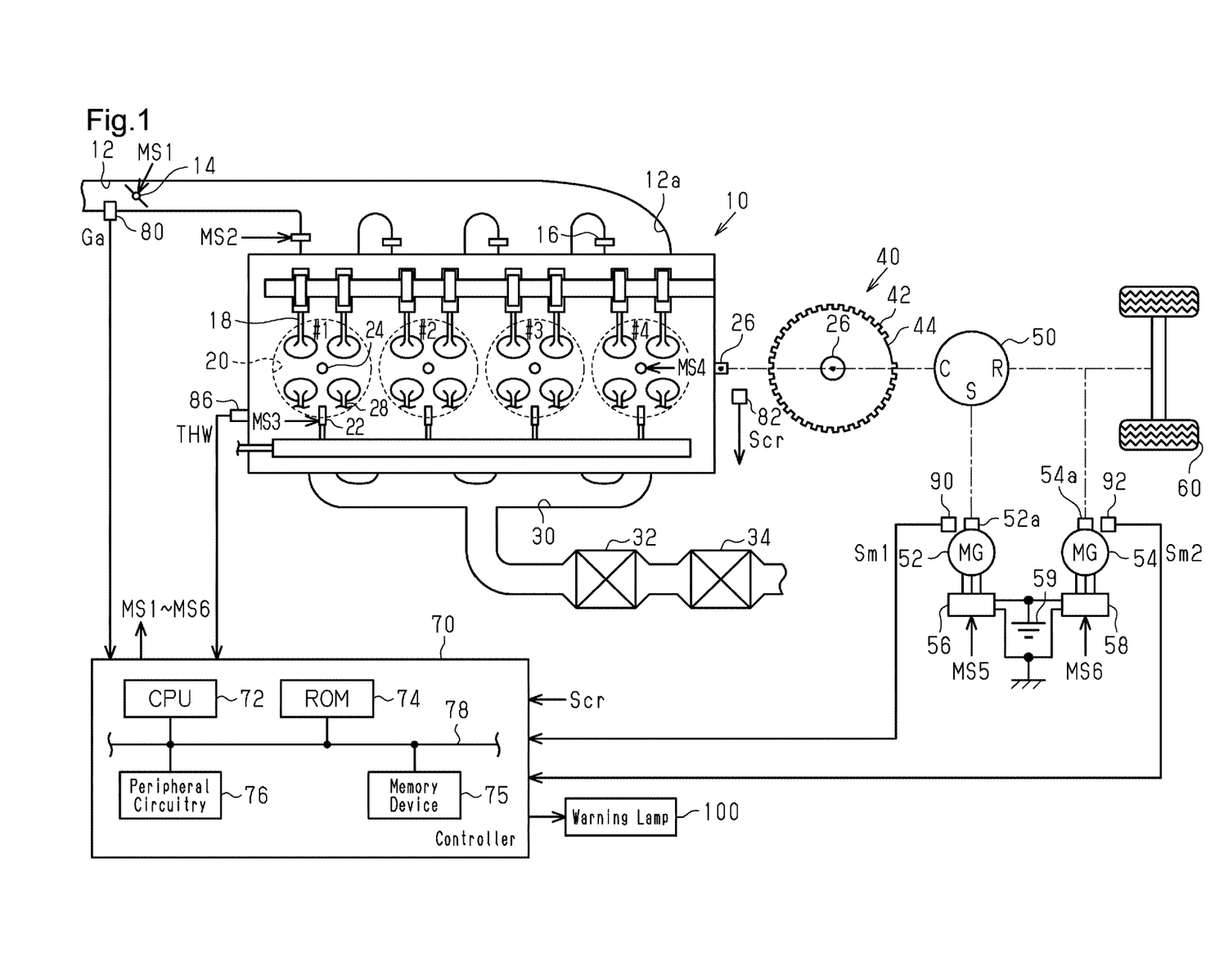
FIG. 1 is a diagram showing the configuration of a drivetrain and a controller according to a first embodiment.

As shown in FIG. 1, an internal combustion engine 10 includes four cylinders #1 to #4. An intake passage 12 of the internal combustion engine 10 incorporates a throttle valve 14. The intake passage 12 includes intake ports 12a in a downstream section. Each intake port 12a is provided with a port injection valve 16, which injects fuel into the intake port 12a. Air drawn into the intake passage 12 and fuel injected from the port injection valves 16 flow into combustion chambers 20 when intake valves 18 are opened. A direct injection valve 22 injects fuel into each combustion chamber 20. Air-fuel mixture in the combustion chamber 20 is burned by spark discharge of an ignition plug 24. This generates combustion energy, which is in turn converted into rotational energy of a crankshaft 26.

The air-fuel mixture burned in the combustion chambers 20 is discharged to an exhaust passage 30 as exhaust gas when exhaust valves 28 are opened. The exhaust passage 30 is provided with a three-way catalyst 32, which has an oxygen storage capacity, and a gasoline particulate filter (GPF 34). The GPF 34 includes a filter that traps particulate matter (PM) and supports a three-way catalyst.

A crank rotor 40 having teeth 42 is coupled to the crankshaft 26. The teeth 42 indicate respective rotation angles of the crankshaft 26. The teeth 42 are basically arranged at 10° C.A intervals on the crank rotor 40. The crank rotor 40 also has a toothless section 44, at which the interval between the adjacent teeth 42 is 30° C.A. The toothless section 44 indicates a referential rotation angle of the crankshaft 26.

The crankshaft 26 is mechanically coupled to a carrier C of a planetary gear mechanism 50, which is part of a power splitter. The planetary gear mechanism 50 includes a sun gear S, which is mechanically coupled to a rotary shaft 52a of a first motor-generator 52. The planetary gear mechanism 50 includes a ring gear R, which is mechanically coupled to a rotary shaft 54a of a second motor-generator 54 and to driven wheels 60. Alternating-current voltage of an inverter 56 is applied to terminals of the first motor-generator 52. Also, alternating-current voltage of an inverter 58 is applied to terminals of the second motor-generator 54. The inverters 56, 58 are power converter circuits that convert the terminal voltage of a battery 59, which is a direct-current voltage source, into alternating-current voltage.

A controller 70 controls the internal combustion engine 10 and operates operated units of the internal combustion engine 10, such as the throttle valve 14, the port injection valves 16, the direct injection valves 22, and the ignition plugs 24, thereby controlling torque and the ratios of exhaust components, which are controlled variables. Also, the controller 70 controls the first motor-generator 52. Specifically, the controller 70 operates the inverter 56, thereby controlling the rotation speed, which is a controlled variable, of the first motor-generator 52. Further, the controller 70 controls the second motor-generator 54. Specifically, the controller 70 operates the inverter 58, thereby controlling torque, which is a controlled variable, of the second motor-generator 54. FIG. 1 shows operation signals MS1 to MS6 respectively corresponding to the throttle valve 14, the port injection valves 16, the direct injection valves 22, the ignition plugs 24, and the inverters 56, 58. To control controlled variables of the internal combustion engine 10, the controller 70 refers to an intake air amount Ga detected by an air flow meter 80, an output signal Scr of a crank angle sensor 82, and a coolant temperature THW detected by a coolant temperature sensor 86. Further, to control controlled variables of the first motor-generator 52 and the second motor-generator 54, the controller 70 refers to an output signal Sm1 of a first rotation angle sensor 90, which detects a rotation angle of the first motor-generator 52, and an output signal Sm2 of a second rotation angle sensor 92, which detects a rotation angle of the second motor-generator 54.

The controller 70 includes a central processing unit (CPU) 72, a read-only memory (ROM) 74, a memory device 75, and peripheral circuitry 76, which can communicate with each other through a communication line 78. The peripheral circuitry 76 includes a circuit that generates a clock signal regulating internal operations, a power supply circuit, and a reset circuit. The controller 70 controls the controlled variables by causing the CPU 72 to execute programs stored in the ROM 74.

Figure 2:
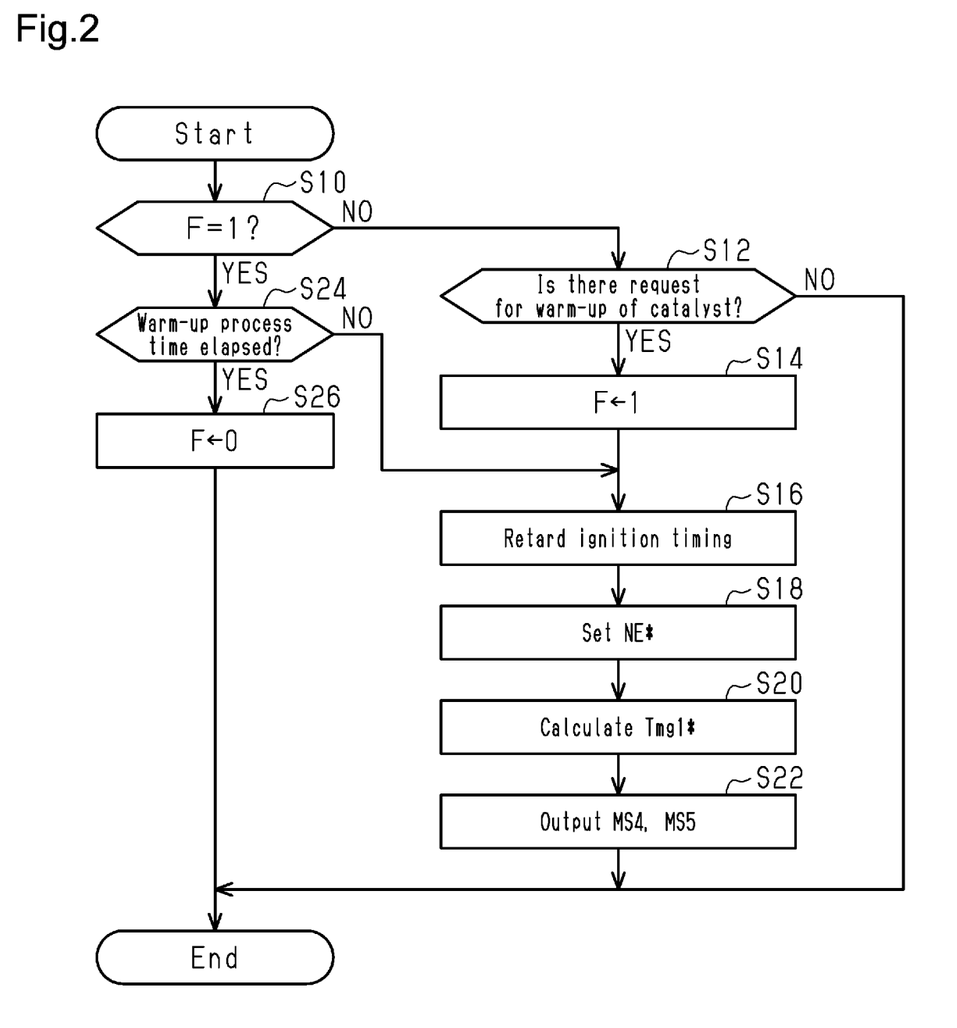
FIG. 2 is a flowchart showing a procedure of processes related to warm-up of a catalyst.

FIG. 2 shows a procedure of processes executed by the controller 70. The process shown in FIG. 2 is implemented by the CPU 72 repeatedly executing programs stored in the ROM 74 at a specific interval. In the following description, the number of each step is represented by the letter S followed by a numeral.

In the series of processes shown in FIG. 2, the CPU 72 first determines whether a flag F is 1 (S10). The flag F is 1 when indicating that a warm-up process of the three-way catalyst 32 is being executed, and is 0 when indicating that the warm-up process is not being executed. When the flag F is 0 (S10: NO), the CPU 72 determines whether there is a request for the warm-up process of the three-way catalyst 32 (S12). For example, the CPU 72 may determine that there is a request for the warm-up process if the present time is immediately after start-up of the internal combustion engine 10, and the coolant temperature THW is lower than or equal to a specific temperature.

When there is a request for the warm-up process (S12: YES), the CPU 72 assigns 1 to the flag F (S14). The CPU 72 executes a process for retarding the ignition timing as the warm-up process (S16). Retardation of the ignition timing refers to a process of retarding the ignition timing, which is determined in accordance with the operating point of the internal combustion engine 10, by a specific amount in order to execute the warm-up process.

Next, the CPU 72 sets an engine speed command value NE*, which is a command value for a rotation speed NE of the crankshaft 26, to a value for the warm-up process (S18). The value for the warm-up process is a fixed value. The CPU 72 calculates a first requested torque Tmg1*, which is a requested torque for the first motor-generator 52 (S20). The first requested torque Tmg1* is an operation variable for performing feedback control in which the rotation speed NE of the internal combustion engine 10 is fed back to the engine speed command value NE* (S20). The rotation speed NE is calculated by the CPU 72 based on the output signal Scr. The rotation speed NE is an average rotation speed of the crankshaft 26 in a period that is longer than or equal to one combustion cycle. The CPU 72 may calculate the rotation speed NE through a process for obtaining a simple moving average of the instantaneous speed in one or more combustion cycles or a process for obtaining an exponential moving average of the instantaneous speed. The instantaneous speed is the rotation speed of the crankshaft 26 within an angular interval less than or equal to the interval between the occurrences of the compression top dead center. The CPU 72 outputs the operation signal MS4 to the ignition plugs 24, thereby operating the ignition plugs 24 in accordance with the retarded ignition timing, and outputs the operation signal MS5 to the inverter 56, thereby operating the inverter 56 to control the torque of the first motor-generator 52 in accordance with the first requested torque Tmg1* (S22).

When the flag F is 1 (S10: YES), the CPU 72 determines whether a predetermined amount of time has elapsed as the execution time of the warm-up process (S24). When the execution time of the warm-up process has not reached the predetermined amount of time (S24: NO), the CPU 72 proceeds to the process of S16. When the execution time of the warm-up process exceeds the predetermined amount of time (S24: YES), the CPU 72 assigns 1 to the flag F (S26).

When completing the process of S22 or S26, or when making a negative determination in the process of S12, the CPU 72 temporarily suspends the series of processes shown in FIG. 2.

Figure 3:
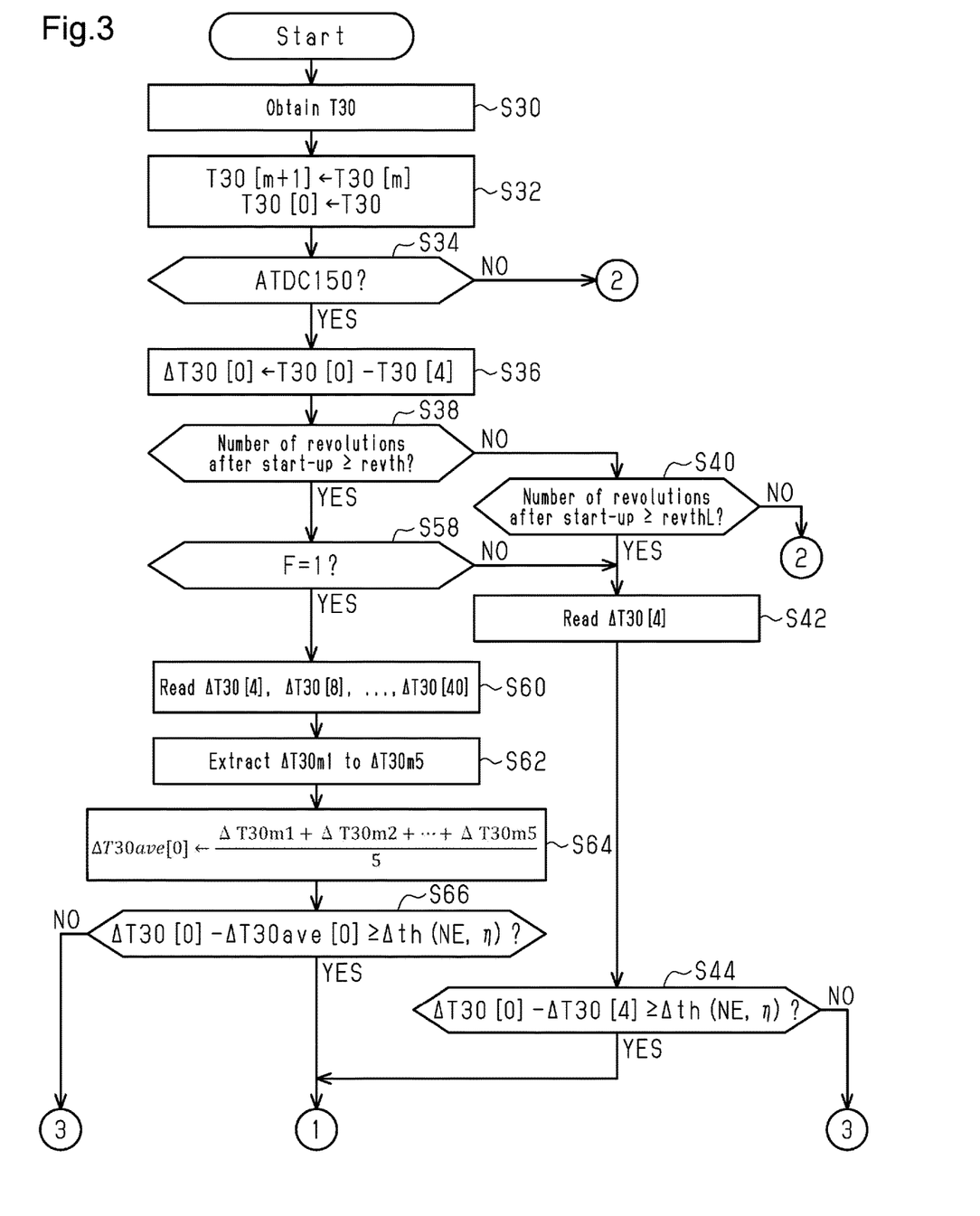
FIG. 3 is a flowchart showing a procedure of processes related to misfire determination.
Figure 4:
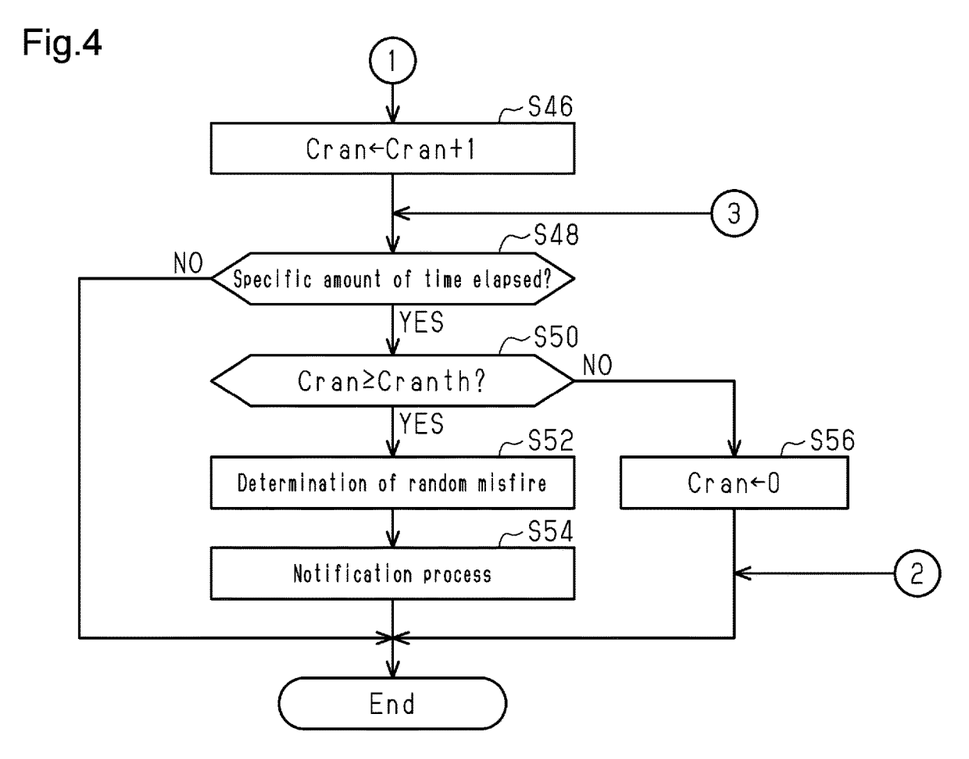
FIG. 4 is a flowchart showing a procedure of processes related to the misfire determination.

FIGS. 3 and 4 show another process executed by the controller 70. The process shown in FIGS. 3 and 4 is implemented by the CPU 72 repeatedly executing programs stored in the ROM 74 at a specific interval.

In the series of processes shown in FIGS. 3 and 4, the CPU 72 first obtains time T30, which is an amount of time required by the crankshaft 26 to rotate 30° C.A as shown in FIG. 3 (S30). The CPU 72 calculates the time T30 by measuring an amount of time in which a tooth 42 of the crank rotor 40 that faces the crank angle sensor 82 is replaced by another tooth 42 that is separated from the first tooth 42 by 30° C.A as the crankshaft 26 rotates. Next, the CPU 72 replaces time T30[m+1] with time T30[m] (m=0, 1, 2, 3 . . . ). Also, the CPU 72 replaces time T30[0] with the time T30, which has been newly obtained in the process of S30 (S32). Accordingly, the number in the bracket following the time T30 has a value that is incremented by 1 for each regression of the execution of the process. When two values of T30 are compared, and the variable in the bracket of one of the compared values is greater than that of the other by 1, the former precedes the latter by 30° C.A.

Next, the CPU 72 determines whether the current rotation angle of the crankshaft 26 is 150° C.A after top dead center (ATDC) with respect to the compression top dead center of any of the cylinders #1 to #4 (S34). If the current rotation angle is 150° C.A ATDC (S34: YES), the CPU 72 selects one of the cylinders #1 to #4 as a cylinder subject to determination as to whether there is a misfire, calculates the rotation fluctuation amount ΔT30[0] of the selected cylinder, and stores the calculated value in the memory device 75 (S36). Specifically, the CPU 72 subtracts time T30[4] from the latest time T30[0], thereby calculating the rotation fluctuation amount ΔT30[0]. The time T30[4] is the time required by the crankshaft 26 to rotate a range from the compression top dead center of the cylinder subject to the determination to 30° C.A ATDC. Thus, in a case in which there is no misfire, the time T30[0] is shorter than the time T30[4], the rotation fluctuation amount ΔT30[0] has a negative value. In contrast, in a case in which there is a misfire, the rotation fluctuation amount ΔT30[0] has a positive value.

The greater the number in the bracket following the rotation fluctuation amount ΔT30, the older that value becomes. That is, the rotation fluctuation amount ΔT30[1] is the rotation fluctuation amount ΔT30 of the cylinder in which the compression top dead center occurred immediately prior to the cylinder in which the compression top dead center is currently occurring.

Next, the CPU 72 determines whether a total number of revolutions of the internal combustion engine 10 after start-up has reached a specific value revth (S38). If the total number of revolutions is less than the specific value revth (S38: NO), the CPU 72 determines whether the total number of revolutions after start-up is greater than or equal to a defined value revthL (S40). The defined value revthL is less than the specific value revth and is set to two. If the total number of revolutions is greater than or equal to the defined value revthL (S40: YES), the CPU 72 reads the rotation fluctuation amount ΔT30[4] of the previous combustion cycle from the memory device 75 (S42). The CPU 72 then determines whether a value obtained by subtracting the rotation fluctuation amount ΔT30[4] from the rotation fluctuation amount ΔT30[0] is greater than or equal to a determination value Δth (S44). This process determines whether a misfire has occurred in the cylinder subject to the determination. That is, if a misfire has not occurred in the current combustion stroke, which is subject to the determination, the current rotation fluctuation amount ΔT30[0] is of a magnitude similar to the rotation fluctuation amount ΔT30[4]. Accordingly, the value obtained by subtracting the rotation fluctuation amount ΔT30[4] from the rotation fluctuation amount ΔT30[0] is substantially 0. In contrast, if a misfire has occurred in the current combustion stroke, which is subject to the determination, the current rotation fluctuation amount ΔT30[0] has a positive value. Accordingly, the value obtained by subtracting the rotation fluctuation amount ΔT30[4] from the rotation fluctuation amount ΔT30[0] is a large positive value. This is based on the assumption that a misfire did not occur in the combustion stroke of the previous combustion cycle, which corresponds to the rotation fluctuation amount ΔT30[4].

The CPU 72 varies the determination value Δth in accordance with the rotation speed NE and a charging efficiency η. Specifically, the CPU 72 calculates the determination value Δth to a smaller value when the rotation speed NE is relatively high than when the rotation speed NE is relatively low. Also, the CPU 72 calculates the determination value Δth to a greater value when the charging efficiency η is relatively high than when the charging efficiency η is relatively low. Specifically, the ROM 74 stores in advance map data having the rotation speed NE and the charging efficiency η as input variables and the determination value Δth as an output variable. The CPU 72 obtains the determination value Δth through map calculation.

The map data refers to a data set of discrete values of input variables and values of output variables each corresponding to a value of the input variables. When the value of an input variable agrees with any of the values of the input variable on the map data, the map calculation uses the value of the corresponding output variable on the map data as the calculation result. When the value of the input variable does not agree with any of the values of the input variable on the map data, the map calculation uses, as the calculation result, a value obtained through interpolation of multiple values of the output variable included in the map data set.

The charging efficiency η is calculated by the CPU 72 on the basis of the intake air amount Ga. If the value obtained by subtracting the rotation fluctuation amount ΔT30[4] from the rotation fluctuation amount ΔT30[0] is greater than or equal to the determination value Δth (S44: YES), the CPU 72 increments a misfire counter Cran (FIG. 4: S46). When the process of S46 is completed or when making a negative determination in the process of S44, the CPU 72 determines whether a specific amount of time has elapsed (S48). The specific amount of time has a specific length starting from a more recent one of the point in time at which the process of S44 was first executed and the point in time at which the process of S56, which will be discussed below, was executed.

When the specific amount of time has elapsed (S48: YES), the CPU 72 determines whether the misfire counter Cran is greater than or equal to a determination value Cranth (S50). If the misfire counter Cran is greater than or equal to the determination value Cranth (S50: YES), the CPU 72 determines that a misfire has occurred (S52). Then, the CPU 72 operates a warning lamp 100 shown in FIG. 1 to perform notification of the occurrence of a misfire (S54). The determination that a misfire has occurred is determination that the frequency of misfire is higher than or equal to a specific level in the internal combustion engine 10. For example, if a misfire occurs only once during the specific amount of time, a notification process is not executed. That is, the determination that a misfire has occurred is a determination that the occurrence of a misfire is frequent enough to necessitate the execution of the notification process.

If the misfire counter Cran is less than the determination value Cranth (S50: NO), the CPU 72 initializes the misfire counter Cran (S56). In contrast, when determining that the total number of revolutions is greater than or equal to the specific value revth in the process of S38 in FIG. 3, the CPU 72 determines whether the flag F is 1 (S58). If the flag F is 0 (S58: NO), the CPU 72 proceeds to the process of S42. If the flag F is 1 (S58: YES), the CPU 72 reads ten rotation fluctuation amounts ΔT30[4], ΔT30[8], . . . , ΔT30[40] from the memory device 75 (S60). These ten rotation fluctuation amounts ΔT30 are the most recent rotation fluctuation amounts ΔT30 of the cylinders determined to have passed the compression top dead center by 150° in the process of S34. The specific value revth in the process of S38 is a number of revolutions during which the ten rotation fluctuation amounts ΔT30 are stored in the memory device 75.

The CPU 72 selects and extracts five of the ten amounts in order of increasing, as rotation fluctuation amounts ΔT30$m$1 to ΔT30$m$5 (S62).

Figure 5:
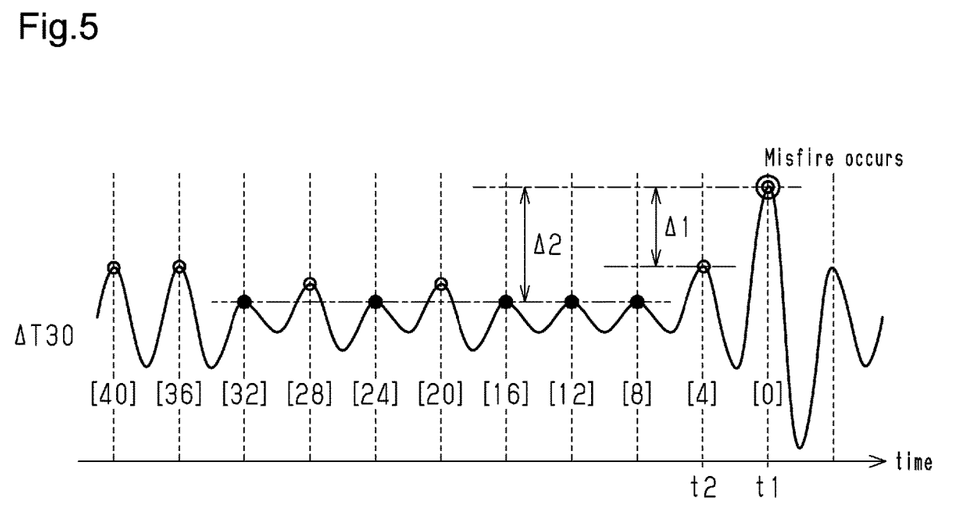
FIG. 5 is a timing diagram showing an operation of the first embodiment.

FIG. 5 schematically illustrates time-series data of the rotation fluctuation amounts ΔT30. The rotation fluctuation amount ΔT30[0] at a point in time t1 is the latest rotation fluctuation amount ΔT30. In other words, the rotation fluctuation amount ΔT30[0] is an amount related to the cylinder subject to the determination. The rotation fluctuation amount ΔT30[4], ΔT30[8], . . . are amounts as measured in 720° C.A increments moving into the past from the present time. In the example shown in FIG. 5, the smallest five of the ten rotation fluctuation amount ΔT30[4], ΔT30[8], . . . , ΔT30[40] are the rotation fluctuation amount ΔT30[8], ΔT30[12], ΔT30[16], ΔT30[24], and ΔT30[32].

Referring to FIG. 3, the CPU 72 assigns the simple moving average of the extracted five rotation fluctuation amounts ΔT30$m$1 to ΔT30$m$5 to an average ΔT30ave[0] (S64). The CPU 72 then determines whether a value obtained by subtracting the average ΔT30ave[0] from the rotation fluctuation amount ΔT30[0] is greater than or equal to the determination value Δth (S66). If the obtained value is greater than or equal to the determination value Δth (S66: YES), the CPU 72 proceeds to the process of S46 of FIG. 4. If the obtained value is less than the determination value Δth (S66: NO), the CPU 72 proceeds to the process of S48 of FIG. 4.

When completing the process of S54 or S56, or when making a negative determination in S34, S40, or S48, the CPU 72 temporarily suspends the series of processes shown in FIGS. 3 and 4.

An operation and advantages of the first embodiment will now be described.

The CPU 72 determines whether there is a misfire based on the comparison between the determination value Δth and the relative magnitude of the rotation fluctuation amount ΔT30[0], which is related to the determination subject, in relation to the rotation fluctuation amount ΔT30[4] for comparison.

During cold start of the internal combustion engine 10, the CPU 72 performs an operation for retarding the ignition timing in order to warm up the three-way catalyst 32. When performing the operation for retarding the ignition timing in order to warm up the three-way catalyst 32, the CPU 72 uses, as the rotation fluctuation amount ΔT30 for comparison, the average ΔT30ave[0] of five rotation fluctuation amounts ΔT30 extracted from the rotation fluctuation amounts ΔT30[4], ΔT30[8], ..., ΔT30[40] of the past ten combustion cycles, instead of using the rotation fluctuation amount ΔT30[4] of the previous combustion cycle. Thus, even if combustion is unstable due to the retarded ignition timing, the average ΔT30ave[0] is not affected significantly. This sets the rotation fluctuation amount for comparison to an appropriate value, and thus minimizes the reduction in the accuracy of determination of a misfire due to unstable combustion.

Also, as shown in FIG. 5, the rotation fluctuation amount ΔT30[4] is closer to the value at the time when a misfire occurs than the rotation fluctuation amount ΔT30[8]. Accordingly, a difference Δ1 between the rotation fluctuation amount ΔT30[4] and the rotation fluctuation amount ΔT30[0] at the time when the misfire occurs is smaller than a difference Δ2 between the rotation fluctuation amount ΔT30[8] and the rotation fluctuation amount ΔT30[0] at the time when the misfire occurs. Therefore, if the single rotation fluctuation amount ΔT30 is used as the amount for comparison when the combustion is unstable, it may be erroneously determined that a misfire is not occurring despite the fact that a misfire is occurring.

Figure 6A:
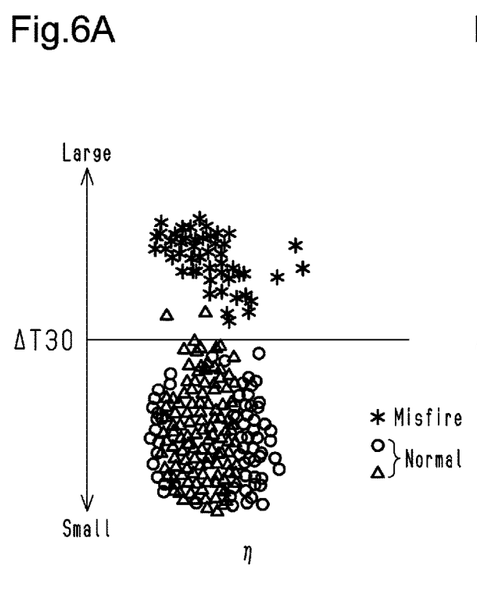
FIGS. 6A and 6B are diagrams showing an operation of the first embodiment.
Figure 6B:
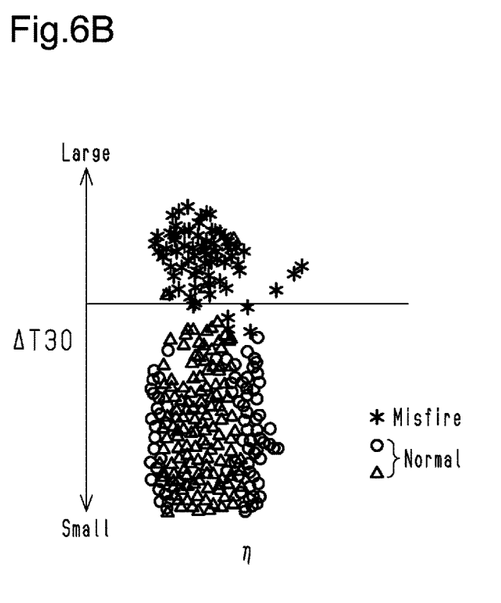

FIG. 6A shows results of misfire determination according to the first embodiment. FIG. 6B shows results of misfire determination when the process of S44 is executed even during the warm-up process of the catalyst. In both FIGS. 6A and 6B, it is determined that a misfire has occurred when the rotation fluctuation amount ΔT30 related to the determination subject is on the "Large" side of the solid line.

As shown in FIG. 6A, the rotation fluctuation amounts ΔT30 when a misfire has occurred are values on the "Large" side of the solid line in the first embodiment. Accordingly, all the misfires that actually occurred are determined to be misfires. In contrast, in the comparative example in FIG. 6B, some of the rotation fluctuation amounts ΔT30 when a misfire occurs are on the "Small" side of the solid line. Accordingly, some of the misfires that actually occurred are not determined to be misfires.

Accordingly, the first embodiment further has the following operation and advantages.

(1) From the rotation fluctuation amounts ΔT30[4], ΔT30[8], ..., ΔT30[40] of the past ten combustion cycles, the five values that are farther from the value at the time when the misfire occurs are extracted, and the average ΔT30ave[0] of the extracted five rotation fluctuation amounts ΔT30 is calculated. This sets the average ΔT30ave[0] to a more appropriate value as a reference value for a case in which a misfire has not occurred.

(2) During the warm-up process of the catalyst, the rotation speed NE of the internal combustion engine 10 is controlled to be a fixed value. This prevents the average ΔT30ave from being affected by the low frequency components of a case in which the rotation speed changes over a period longer than a single combustion cycle of the crankshaft 26. Thus, as compared to a case in which influence of low frequency components is conspicuous, the average ΔT30ave[0] is set to a more appropriate value to be compared with the rotation fluctuation amount ΔT30[0] related to the determination subject.

SECOND EMBODIMENT

A second embodiment will now be described with reference to the drawings. The differences from the first embodiment will mainly be discussed.

In the first embodiment, the average ΔT30ave[0] is used as the amount to be compared with the rotation fluctuation amount ΔT30[0] on condition that the warm-up process is being executed. In contrast, the second embodiment always uses the average ΔT30ave[0] when the total number of revolutions after start-up is greater than or equal to a specific value revth.

Figure 7:
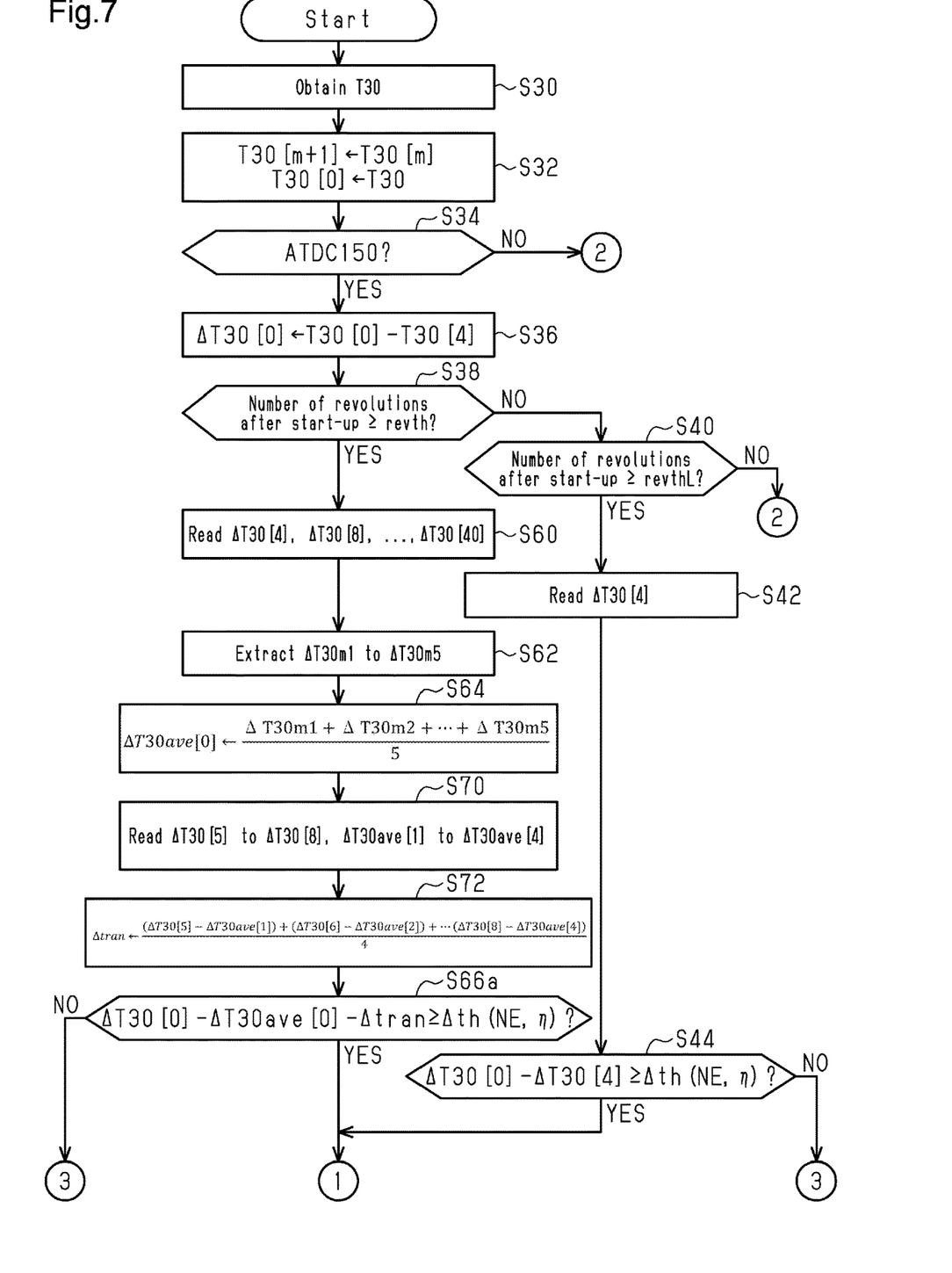
FIG. 7 is a flowchart showing a procedure of processes related to misfire determination according to a second embodiment.

FIG. 7 shows a procedure of processes executed by a controller 70 according to the second embodiment. The process shown in FIG. 7 is implemented, together with the process shown in FIG. 4, by the CPU 72 repeatedly executing programs stored in the ROM 74 at a specific interval. In the process shown in FIG. 7, the same step numbers are given to the processes that correspond to those in FIG. 3.

In the series of processes shown in FIG. 7, the CPU 72 reads the rotation fluctuation amounts ΔT30[5] to ΔT30[8] and the averages ΔT30ave[1] to ΔT30ave[4] when the process of S64 is completed (S70). The CPU 72 then subtracts an average ΔT30ave[i] from a rotation fluctuation amount ΔT30[4+i] while incrementing the value of i from 1 to 4 (i=1 to 4) to obtain four values, and assigns the average of the four values to a transient correction amount Δtran (S72). The CPU 72 then determines whether a value obtained by subtracting the average ΔT30ave[0] and the transient correction amount Δtran from the rotation fluctuation amount ΔT30[0] is greater than or equal to the determination value Δth (S66a).

If the obtained value is greater than or equal to the determination value Δth (S66a: YES), the CPU 72 proceeds to the process of S46 of FIG. 4. If the obtained value is less than the determination value Δth (66a: NO), the CPU 72 proceeds to the process of S48 of FIG. 4.

In this manner, the second embodiment uses the transient correction amount Δtran to change the exceeding amount of the rotation fluctuation amount ΔT30[0], which is subject to the determination, in relation to the average ΔT30ave[0] at the time when it is determined that a misfire has occurred. Accordingly, even if the rotation speed NE of the crankshaft 26 changes over a period longer than a single combustion cycle, such a change will not reduce the accuracy of determination as to whether there is a misfire. That is, when the rotation speed NE is gradually decreasing, older one among the past rotation fluctuation amounts ΔT30[4], ΔT30[8], ..., ΔT30[40] is more largely different from the rotation fluctuation amount ΔT30[0] even if the combustion is stable.

In this regard, the second embodiment uses the transient correction amount Δtran to quantify the influence of a change in the rotation speed NE on the value obtained by subtracting the average ΔT30ave[0] from the rotation fluctuation amount ΔT30[0]. That is, the values obtained by subtracting the average ΔT30ave[i] from the rotation fluctuation amount ΔT30[4+i] are each the difference between a single rotation fluctuation amount and the average of five of the past ten rotation fluctuation amounts. Therefore, if there is no misfire, the values obtained by subtracting the average ΔT30ave[i] from the rotation fluctuation amount ΔT30[4+i] are all considered to correspond to a value obtained by subtracting the average ΔT30ave[0] from the rotation fluctuation amount ΔT30[0] Also, if there is no misfire, the values obtained by subtracting the average ΔT30ave[i] from the rotation fluctuation amount ΔT30[4+i] are values affected by a change in the rotation speed NE.

Therefore, in the second embodiment, even if the rotation speed NE of the crankshaft 26 changes over a period longer than a single combustion cycle and includes low frequency components, such a change will not reduce the accuracy of determination as to whether there is a misfire.

THIRD EMBODIMENT

A third embodiment will now be described with reference to the drawings. The differences from the second embodiment will mainly be discussed.

The second embodiment monitors whether there is an anomaly in which a misfire occurs excessively frequently during a specific period. In contrast, the third embodiment monitors an anomaly in which a misfire occurs excessively frequently in a specific cylinder during a specific period. This phenomenon is referred to consecutive misfires.

Figure 8:
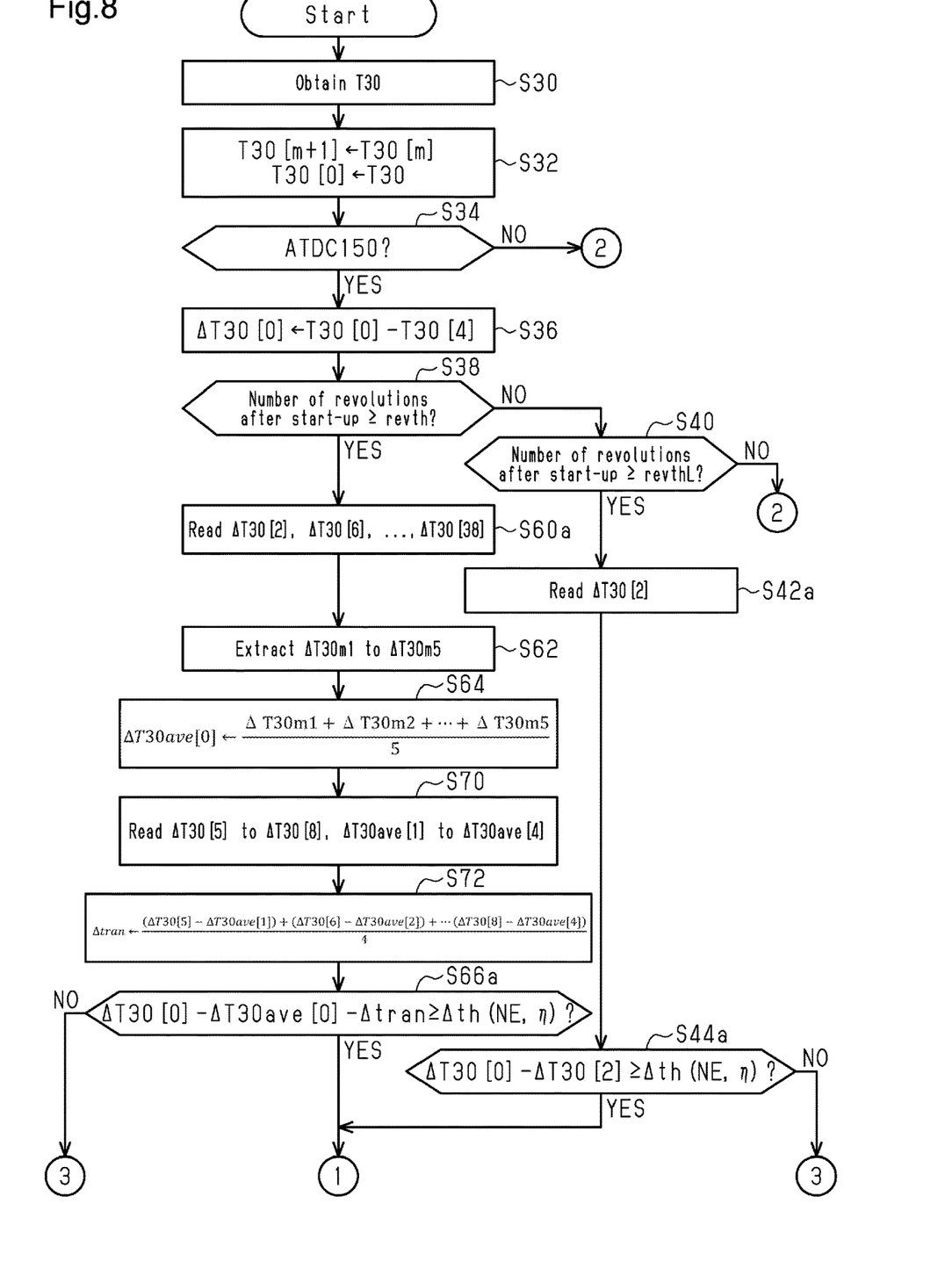
FIG. 8 is a flowchart showing a procedure of processes related to misfire determination according to a third embodiment.
Figure 9:
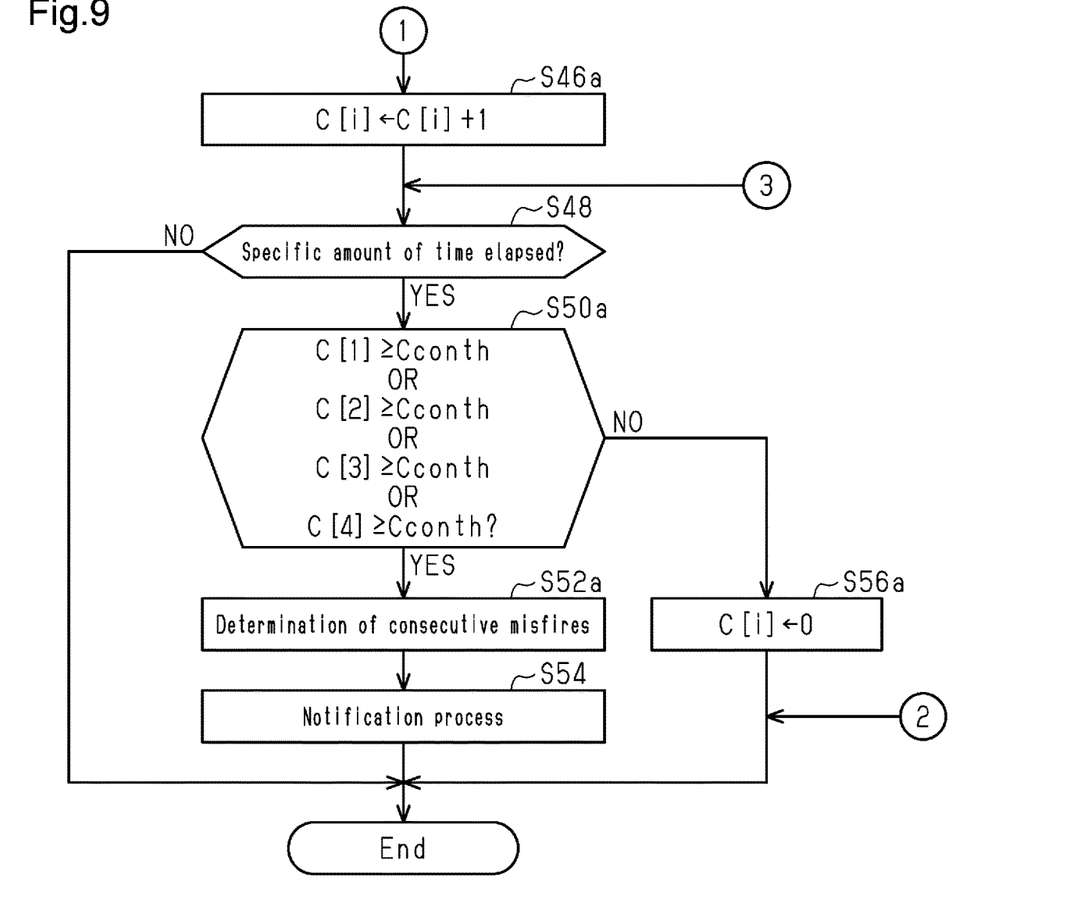
FIG. 9 is a flowchart showing a procedure of process related to misfire determination.

FIGS. 8 and 9 show a procedure of processes executed by a controller 70 according to the third embodiment. The process shown in FIGS. 8 and 9 is implemented by the CPU 72 repeatedly executing programs stored in the ROM 74 at a specific interval. In the process shown in FIGS. 8 and 9, the same step numbers are given to the processes that correspond to those in FIGS. 4 and 7.

In the series of processes shown in FIGS. 8 and 9, the CPU 72 reads a rotation fluctuation amount $\Delta T30[2]$ when making an affirmative determination in the process of S40 (S42a). The CPU 72 then determines whether a value obtained by subtracting the rotation fluctuation amount $\Delta T30[2]$ from the rotation fluctuation amount $\Delta T30[0]$ is greater than or equal to the determination value $\Delta th$ (S44a).

When making an affirmative determination in the process of S38, the CPU 72 reads ten rotation fluctuation amounts $\Delta T30[2]$, $\Delta T30[6]$, ..., $\Delta T30[38]$ from the memory device 75 (S60a). This process reads the past ten rotation fluctuation amounts $\Delta T30$ of a cylinder of which the occurrence of the compression top dead center is separated from that of the cylinder subject to the determination by 360° C.A. The CPU 72 executes the processes of S62, S64, S70, S72, and S66a for the read ten values.

When making an affirmative determination in the process in S44a or S66a, the CPU 72 increments a counter C[i] of the cylinder subject to the determination (i=1 to 4) (FIG. 9: S46a). That is, when the rotation fluctuation amount $\Delta T30$ [0] is related to the cylinder #1, the CPU 72 increments the counter C[1].

When completing the process of S46a or when making a negative determination in the process of S44a or S66a, the CPU 72 proceeds to the process of S48. When determining that the specific amount of time has elapsed (S48: YES), the CPU 72 determines whether at least one of the counters C[1] to C[4] is greater than or equal to a threshold Cconth (S50a). When at least one of the counters C[1] to C[4] is greater than or equal to the threshold Cconth, (S50a: YES), the CPU 72 determines that consecutive misfires are occurring in one of the cylinders (S52a), and proceeds to the process of S54. In contrast, when determining that the counters C[1] to C[4] are less than the threshold Cconth (S50a: NO), the CPU 72 initializes the counters C[1] to C[4] (S56a). When completing the process of S56a, the CPU 72 temporarily suspends the series of processes shown in FIGS. 8 and 9.

<Correspondence>

The correspondence between the items in the above-described embodiments and the items described in the above SUMMARY is as follows. Below, the correspondence is shown for each claim number. [1] The torque index value corresponds to the rotation fluctuation amount $\Delta T30$. The calculating process corresponds to the process of S36. The determination process corresponds to S44 to S52, S56, and S66 in FIGS. 3 and 4, S44 to S52, S56, and S66a in FIGS. 4 and 7, and S44a, S46a, S48, S50a, S52a, S56a, and S66a in FIGS. 8 and 9. The average corresponds to the average $\Delta T30$ave[0]. The determination value corresponds to the determination value $\Delta th$. [2] The defined number corresponds to ten, and the specific number corresponds to five. [3] The retardation process corresponds to the processes of S16 and S22. [4] The rotation fluctuation amount corresponds to the rotation fluctuation amount $\Delta T30$. The instantaneous speed variable corresponds to the time T30. [5, 6] The low frequency component extracting process corresponds to the processes of S70 and S72. The determination process corresponds to S44 to S52, S56, and S66a of FIGS. 4 and 7, and S44a, S46a, S48, S50a, S52a, S56a, and S66a of FIGS. 8 and 9. The amount of change corresponds to the transient correction amount $\Delta tran$. [7] The electric motor corresponds to the first motor-generator 52. The fixed-value control process corresponds to the processes of S18 to S22.

OTHER EMBODIMENTS

The above-described embodiments may be modified as follows. The above-described embodiments and the following modifications can be combined as long as the combined modifications remain technically consistent with each other.

Modifications Related to Instantaneous Speed Variable

In the above-described embodiments, the crank angle range of 30° C.A is used to define the instantaneous speed variable, which is a variable representing the rotation speed of the crankshaft 26 in the crank angle range less than or equal to the interval of the compression top dead center. For example, the crank angle range may be 10° C.A or may be the interval of the compression top dead center.

The instantaneous speed variable is not limited to a value having a dimension of time, but may be a value having a dimension of speed.

Modification Related to Rotation Fluctuation Amount

In the above-described embodiments, the rotation fluctuation amount $\Delta T30$ is defined as the difference between instantaneous speed variables separated by a specific interval, and the specific interval is 120° C.A. However, the present disclosure is not limited to this. The specific interval may be, for example, 90° C.A or 180° C.A. The specific interval is preferably shorter than or equal to the interval between the occurrences of the compression top dead center.

The rotation fluctuation amount does not necessarily need to be the difference between the instantaneous speed variables separated from each other by a specific interval, but may be ratio between instantaneous speed variables separated from each other by a specific interval.

Modification Related to Average

In the example shown in FIGS. 3 and 4 and the example shown in FIGS. 3 and 7, the average $\Delta T30$ave[0] is the average of the past rotation fluctuation amounts $\Delta T30$ related to the cylinder subject to misfire determination. However, the present disclosure is not limited to this. For example, the current rotation fluctuation amount $\Delta T30[0]$ of the cylinder subject to the determination may be the average of some of the values at points that each precede the present time by an integral multiple of 360° C.A.

In the example shown in FIGS. 8 and 9, the average $\Delta T30$ave[0] is the average of the past rotation fluctuation amounts $\Delta T30$ related to a cylinder of which the occurrence of the compression top dead center is separated from that of the cylinder subject to the determination by 360° C.A.

However, the present disclosure is not limited to this. For example, the current rotation fluctuation amount ΔT30[0] of the cylinder subject to the determination may be the average of some of the values at points that each precede the present time by an integral multiple of 360° C.A.

The defined number, which is number of candidates of the rotation fluctuation amounts ΔT30 used to calculate the average ΔT30ave, is not limited to ten. Also, the specific number, which is the number of the rotation fluctuation amounts ΔT30 selected from the defined number of the rotation fluctuation amount ΔT30 to be used to calculate the average, does not necessarily need to be half the defined number.

The average ΔT30ave does not necessarily need to be calculated using part of the rotation fluctuation amounts ΔT30 in a specific period in the past. However, all the rotation fluctuation amounts ΔT30 may be used. In this case, even if the rotation fluctuation amounts ΔT30 used to calculate the average ΔT30ave are affected by unstable rotation behavior of the crankshaft 26, an averaging process reduces the influence on the average ΔT30ave.

Modification Related to Low Frequency Component Extracting Process

The low frequency component extracting process does not necessarily need to include the processes of S70 and S72. For example, it is possible to use the average of the past amounts of ΔT30[0]-ΔT30ave[0], which are corrected using the transient correction amount Δtran. That is, the average of 4T30[1]-ΔT30ave[1], ΔT30[2]-ΔT30ave[2], . . . , ΔT30[4]-ΔT30ave[4] may be used.

When calculating the transient correction amount Δtran as the average of differences between the rotation fluctuation amounts ΔT30 and the averages ΔT30ave, the number of differences does not necessarily need to be equal to the number of the cylinders. For example, it is possible to use the average of ten combustion cycles, which are rotation angle intervals defined in the calculation of the average ΔT30ave.

When calculating the transient correction amount Δtran, the amount subtracted from the rotation fluctuation amount ΔT30 is not limited to the average ΔT30ave. For example, it is possible to use the average of all the rotation fluctuation amounts ΔT30 in ten combustion cycles, which correspond to a period defined in the calculation of the average 4T30ave.

Modification Related to Torque Index Value

The torque index value that is calculated using the output signal Scr of the crank angle sensor 82 as an input is not limited to the rotation fluctuation amount. For example, the average of the shaft torque of the internal combustion engine 10 in a specific period may be used. The average of the shaft torque can be calculated, for example, using the following expression (c1).

$$Te = Ie \cdot d\omega e + (1+\rho)/\{\rho \cdot (Ig1 \cdot d\omega m1 - Tr)\} \quad (c1)$$

The expression (c1) uses a shaft torque Te, a rate of change dωe of an instantaneous speed ωe of the internal combustion engine 10, which is calculated from the reciprocal of the time T30, a moment of inertia Ie of the internal combustion engine 10, a moment of inertia Ig1 of the first motor-generator 52, an angular acceleration dωm1 of the first motor-generator 52, a reaction torque Tr of the first motor-generator 52, and a planetary gear ratio ρ of the planetary gear mechanism 50. The above-described specific period is shorter than or equal to the interval between the occurrences of the compression top dead center.

Modification Related to Determination Value

In the above-described embodiments, the determination value Δth is set based on the rotation speed NE and the charging efficiency η. However, the present disclosure is not limited to this. For example, in place of the charging efficiency η, a torque command value delivered to the internal combustion engine 10 or an injection amount may be used.

The determination value Δth does not necessarily need to be varied using variables representing the rotation speed NE and the load as the input. For example, the determination value Δth may be varied using one of these variables. Alternatively, the determination value Δth does not necessarily need to be varied using either of these variables.

The variables used to vary the determination value Δth are not limited a variable representing the load of the internal combustion engine 10 and the rotation speed NE, but may be the coolant temperature THW.

Modification Related to Determination Process

The comparison between the determination value Δth and the relative magnitude of the rotation fluctuation amount ΔT30 in relation to the average ΔT30ave is not limited to the comparison between the determination value Δth and the difference between the average ΔT30ave and the rotation fluctuation amount ΔT30, but may be, for example, comparison between the determination value Δth and the ratio between the average ΔT30ave and the rotation fluctuation amount ΔT30.

When the average of the shaft torque Te during the specific period is used as the torque index value as described in the Modification related to Torque Index Value section, the rotation fluctuation amount ΔT30[0] may be replaced with the shaft torque average, and the average ΔT30ave[0] may be replaced with the average of the past values of the shaft torque average. In this case, it is determined that a misfire has occurred if a value obtained by subtracting the average of the past values of the shaft torque average from the average of the shaft torque Te during the specific period is less than a determination value.

Modification Related to Fixed-Value Control Process

In the above-described embodiments, the first motor-generator 52 controls the rotation speed NE of the internal combustion engine 10 to a fixed value. However, the present disclosure is not limited to this. For example, in a case of a parallel hybrid vehicle as described in the Modification related to Vehicle section below, the rotation speed may be controlled to a fixed value by a single electric motor mechanically coupled to the crankshaft 26.

The component to be operated in order to control the rotation speed NE to a fixed value is not limited to an electric motor. The component to be operated may be an operated unit of the internal combustion engine 10.

Modification Related to Applicable Condition for Process of S66

The applicable condition for the process of S66 is not limited to a condition that the catalyst warm-up control is being performed. For example, the applicable condition may be a condition that the internal combustion engine 10 is idling. Further, the applicable condition may be a condition that forced charging of the battery 59 is being performed, in which the rotation speed NE is maintained at a fixed speed, and the combustion energy of the internal combustion engine 10 is converted into electricity.

Modification Related to Applicable Condition for Process of S66a

In the examples shown in FIGS. 7 and 8, the process of S66a is always executed if an affirmative determination is made in the process of S38. The present disclosure is not limited to this. For example, whether the combustion state is unstable may be determined. If the combustion state is determined to be unstable, the process of S66a may be executed. If the combustion state is determined to be not unstable, the process of S44 or S44a may be executed. The condition in which the combustion state is determined to be unstable includes, for example, a condition that the fuel is heavy fuel, a condition that the rotation speed NE is relatively low, a condition that the coolant temperature THW is lower than or equal to a specific temperature, and a condition that the catalyst warm-up control is being performed.

The applicable condition for the process of S66a is not limited to a condition that the combustion state is unstable. For example, the applicable condition may be a condition that the rotation behavior of the crankshaft 26 is unstable. In this case, the rotation behavior of the crankshaft may be determined to be unstable when the degree of unevenness of the road surface is relatively large. The condition that the rotation behavior of the crankshaft 26 is unstable includes a condition that the combustion state is unstable.

Modification Related to Reflection of Determination Result of Misfire

In the above-described embodiments, the notification process is executed using the warning lamp 100 when it is determined that a misfire has occurred. However, the present disclosure is not limited to this. The notification process is not limited to a process that operates a device outputting visual information, but may be a process that operates a device outputting audio information.

The determination result of a misfire does not necessarily need to be used in the notification process. For example, when a misfire occurs, a process may be executed that operates an operated unit of the internal combustion engine 10 to switch the control of the internal combustion engine 10 to an operating state that is less likely to cause a misfire. That is, the hardware means that is operated to deal with the determination result of a misfire is not limited to a notification device, but may be an operated unit of the internal combustion engine 10 or the like.

Modification Related to Controller

The controller is not limited to a device that includes the CPU 72 and the ROM 74 and executes software processing. For example, at least part of the processes executed by the software in the above-described embodiments may be executed by hardware circuits dedicated to executing these processes (such as an application-specific integrated circuit (ASIC)). That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software processing devices each including a processor and a program storage device and multiple dedicated hardware circuits may be provided.

Modification Related to Vehicle

The vehicle is not limited to a series-parallel hybrid vehicle, but may be a parallel hybrid vehicle or a series hybrid vehicle. Further, the vehicle is not limited to a hybrid electric vehicle, but may be a vehicle that includes only the internal combustion engine 10 as a driver force generator.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A misfire detecting device for an internal combustion engine, the misfire detecting device comprising:
   circuitry configured to:
      calculate a torque index value using an output signal of a crank angle sensor as an input;
      execute a determination process that determines whether there is a misfire based on a magnitude of the torque index value related to a cylinder subject to the determination as to whether there is the misfire, including:
         determining whether there is the misfire based on a comparison between a determination value and a relative magnitude of a current torque index value of the cylinder subject to the determination in relation to an average of past torque index values; and
      increment a misfire counter when there is the misfire, wherein
   the past torque index values are values related to cylinders in each of which a compression top dead center occurs at a point separated from a compression top dead center of the cylinder subject to the determination by an integral multiple of an angle corresponding to one turn of a crankshaft, and
   the torque index value is a variable that characterizes a torque of the crankshaft having a cycle of a length corresponding to an interval between occurrences of the compression top dead center.

2. The misfire detecting device for the internal combustion engine according to claim 1, wherein
   the average is obtained by selecting a specific number of torque index values from a defined number of the torque index values that were calculated in the past and averaging the specific number of the torque index values, the specific number of the torque index values being farthest from the torque index value obtained at a time when the misfire has occurred, and
   the specific number is less than the defined number.

3. The misfire detecting device for the internal combustion engine according to claim 2, wherein the circuitry is further configured to:
   execute a retardation process that retards ignition timing when a temperature of a catalyst in an exhaust passage of the internal combustion engine is relatively low; and
   execute the determination process during the retardation process.

4. The misfire detecting device for the internal combustion engine according to claim 1, wherein
   the torque index value is a rotation fluctuation amount,
   the rotation fluctuation amount is a variable representing a change of an instantaneous speed variable, and
   the instantaneous speed variable is a variable representing a speed of the crankshaft when the crankshaft rotates in a rotation angle range that is less than or equal to the interval between occurrences of the compression top dead center.

5. The misfire detecting device for the internal combustion engine according to claim 4, wherein the circuitry is further configured to:
execute a low frequency component extracting process that extracts an amount of change of a rotation speed of the crankshaft over a period longer than a single combustion cycle, and
determine whether there is the misfire based on whether an absolute value of a difference between the relative magnitude and a magnitude of the determination value is greater than or equal to an absolute value of the amount of change extracted by the low frequency component extracting process.

6. The misfire detecting device for the internal combustion engine according to claim 5, wherein the low frequency component extracting process is a process that extracts, as the amount of change, an average of respective differences between a predetermined number of the rotation fluctuation amounts that are most recent in relation to the rotation fluctuation amount related to the cylinder subject to the determination and the predetermined number of the averages obtained prior to the rotation fluctuation amount of the cylinder subject to the determination.

7. The misfire detecting device for the internal combustion engine according to claim 4, wherein
the crankshaft is mechanically coupled to an electric motor, and
the circuitry is further configured to:
execute a fixed-value control process that uses the electric motor to control a rotation speed of the crankshaft to a fixed value; and
execute the determination process during the fixed-value control process.

8. The misfire detecting device for the internal combustion engine according to claim 1, wherein the circuitry is further configured to, when there is the misfire, operate a notification device to perform notification of an occurrence of the misfire.

9. The misfire detecting device for the internal combustion engine according to claim 1, wherein the circuitry is further configured to, when there is the misfire, operate the internal combustion engine to switch an operating state of the internal combustion engine to a state that is less likely to cause the misfire.

10. A misfire detecting method for an internal combustion engine, the method comprising:
calculating a torque index value using an output signal of a crank angle sensor as an input;
determining whether there is a misfire based on a magnitude of the torque index value related to a cylinder subject to the determination as to whether there is the misfire, including:
determining whether there is the misfire based on a comparison between a determination value and a relative magnitude of a current torque index value of the cylinder subject to the determination in relation to an average of past torque index values; and
incrementing a misfire counter when there is the misfire, wherein
the past torque index values are values related to cylinders in each of which a compression top dead center occurs at a point separated from a compression top dead center of the cylinder subject to the determination by an integral multiple of an angle corresponding to one turn of a crankshaft, and
the torque index value is a variable that characterizes a torque of the crankshaft having a cycle of a length corresponding to an interval between occurrences of the compression top dead center.

11. The misfire detecting method for the internal combustion engine according to claim 10, further comprising operating a notification device to perform notification of an occurrence of the misfire when there is the misfire.

12. The misfire detecting method for the internal combustion engine according to claim 10, further comprising operating the internal combustion engine to switch an operating state of the internal combustion engine to a state that is less likely to cause the misfire when there is the misfire.

13. A misfire detecting device for an internal combustion engine, the misfire detecting device comprising:
circuitry configured to:
calculate a torque index value using an output signal of a crank angle sensor as an input;
execute a determination process that determines whether there is a misfire based on a magnitude of the torque index value related to a cylinder subject to the determination as to whether there is the misfire, including:
determining whether there is the misfire based on a comparison between a determination value and a relative magnitude of a current torque index value of the cylinder subject to the determination in relation to an average of past torque index values;
execute at least one of a retardation process that retards ignition timing when a temperature of a catalyst in an exhaust passage of the internal combustion engine is relatively low and a fixed-value control process that uses an electric motor mechanically coupled to a crankshaft to control a rotation speed of the crankshaft to a fixed value; and
execute the determination process during the at least one of the retardation process and the fixed-value control process, wherein
the past torque index values are values related to cylinders in each of which a compression top dead center occurs at a point separated from a compression top dead center of the cylinder subject to the determination by an integral multiple of an angle corresponding to one turn of the crankshaft, and
the torque index value is a variable that characterizes a torque of the crankshaft having a cycle of a length corresponding to an interval between occurrences of the compression top dead center.

* * * * *